United States Patent
Florent et al.

(10) Patent No.: US 7,553,519 B2
(45) Date of Patent: Jun. 30, 2009

(54) GLASS-CERAMIC AND GLASS PLATES, HEATING PLATES, AND PREPARATION

(75) Inventors: Frederic Henri Florent, Samoreau (FR); David Henry, Morigny Champigny (FR)

(73) Assignee: Eurokera, Chateau-Thierry (FR)

(*) Notice: Subject to any disclaimer, the term of this patent is extended or adjusted under 35 U.S.C. 154(b) by 291 days.

(21) Appl. No.: 11/079,354

(22) Filed: Mar. 11, 2005

(65) Prior Publication Data

US 2005/0214521 A1    Sep. 29, 2005

(30) Foreign Application Priority Data

Mar. 26, 2004  (FR) .................................. 04 03123

(51) Int. Cl.
*B05D 3/02* (2006.01)
*B32B 9/04* (2006.01)

(52) U.S. Cl. ............ 427/387; 428/446; 428/447; 524/588; 219/452.11

(58) Field of Classification Search .............. None
See application file for complete search history.

(56) References Cited

U.S. PATENT DOCUMENTS

| | | | | |
|---|---|---|---|---|
| 4,814,230 A | * | 3/1989 | Vockler | 428/429 |
| 4,833,288 A | | 5/1989 | Poumey | 219/10.493 |
| 6,369,365 B1 | | 4/2002 | Nass | 219/445.1 |
| 6,660,980 B2 | | 12/2003 | Nagata et al. | 219/622 |
| 6,863,923 B1 | * | 3/2005 | Kalleder et al. | 427/226 |
| 2002/0019864 A1 | | 2/2002 | Mayer | 438/238 |
| 2002/0084263 A1 | | 7/2002 | Wennemann et al. | 219/460.1 |
| 2003/0006231 A1 | | 1/2003 | Nagata et al. | 219/622 |
| 2004/0028918 A1 | | 2/2004 | Becker et al. | 428/448 |
| 2004/0253454 A1 | | 12/2004 | Wegert et al. | 428/428 |
| 2005/0214545 A1 | | 9/2005 | Florent et al. | 427/384 |

FOREIGN PATENT DOCUMENTS

| | | | |
|---|---|---|---|
| EP | 0277075 | | 1/1988 |
| EP | 0565743 | | 1/1997 |
| EP | 1267593 A1 | | 1/2003 |
| EP | 1267593 | | 3/2005 |
| GB | 1416591 | | 12/1975 |
| JP | 2000351651 A | * | 12/2000 |
| JP | 2001-181572 | * | 7/2001 |
| JP | 2001-233636 | | 8/2001 |
| JP | 2005298266 A | * | 10/2005 |
| JP | 200640815 A | * | 2/2006 |
| WO | WO03084891 | | 10/2003 |

OTHER PUBLICATIONS

Abstract for JP-2000351651-A.*
Abstract for JP-2005298266-A.*
Abstract for JP-200640815-A.*
Abstract for EP 861014.
Office Action dated Aug. 28, 2007 in U.S. Appl. No. 11/079,358.

* cited by examiner

*Primary Examiner*—Marc S Zimmer
(74) *Attorney, Agent, or Firm*—Michael W. Russell; Siwen 'Steven' Chen

(57) ABSTRACT

Disclosed in the present application include: (i) plates, having two approximately parallel main sides, of a glass-ceramic or a glass displaying a certain transparency, with a colored coating fixed to at least one part of the surface of one of said two main sides; (ii) heating plates, particularly cook-tops, consisting of such plates or obtainable from such plates. These heating plates are intended to be fitted above heating elements, their side bearing said coating facing said heating elements; and (iii) the preparation of such plates. The original colored coating proposed is particularly interesting with reference to its color stability.

6 Claims, No Drawings

GLASS-CERAMIC AND GLASS PLATES, HEATING PLATES, AND PREPARATION

FIELD OF THE INVENTION

The present invention relates to glass-ceramic and glass plates, heating plates and method of preparing the same. In particular, the present invention relates to glass-ceramic and glass plates, especially heating plates, bearing a coating, and method of making such plates.

BACKGROUND OF THE INVENTION

An aim of the present invention is:
plates, having two approximately parallel main sides, of a glass-ceramic or a glass displaying a certain transparency, with a colored coating fixed to at least one part of the surface of one of said two main sides;
heating plates, particularly cook-tops, consisting of such plates or obtainable from such plates. These heating plates are intended to be fitted above heating elements, their side bearing said coating facing said heating elements; and
the preparation of such plates.

The plates of the invention—which are transparent; in any case, sufficiently transparent so that their colored coating be perceptible through their thickness—are characterized by the specific nature of their colored coating.

The heating plates of the invention are particularly efficient, notably with reference to the demanding specifications specified below.

Cook-tops have already been described according to prior art, mainly of glass-ceramic and of toughened glass, with a colored coating on their "lower" side (or reverse side or under side), i.e. the one which is intended to be deposited facing the heating elements.

In the patent application EP-A-277 075, the presence of decorative or marking elements is very generally provided on the reverse side of a glass-ceramic plate which is intended for cooking by induction heating. No precision is provided on the decorative or marking elements in question.

In the patent application EP-A-1 267 593, transparent glass-ceramic plates are described with colored coatings underneath. Said plates are suitable for induction heating, even combined heating: induction heating and radiant heating. The colored coatings in question are enamels with metallic pigments, which are themselves optionally covered with an organic coating (such as a polyimide, polyamide, fluorinated, silicone resin) on the "hot" surfaces.

In the patent application EP-A-861 014, the presence of a paint layer, which is resistant to high temperature, preferably to temperatures of greater than 650° C., is provided on the whole of the side opposite to the one which is intended to receive cooking utensils. Glass-ceramic heating plates are in question, but no precision is provided on the exact nature of the paints mentioned.

Patent applications U.S. Pat. No. 2002/0 084 263 and U.S. Pat. No. 2003/0 019 864 describe glass-ceramic and toughened glass substrates, which are transparent, for use as cooking surface with radiant heating. Said substrates have (U.S. Pat. No. 2002/0 084 263) or do not have (U.S. Pat. No. 2003/0 019 864) a coating of enamel type on their upper side. On their lower side, turned towards the radiant heating elements, the substrates have colored coatings, which are permeable to infra-red, of different natures (notably sol-gel layers with pigments), and which are adapted to the zone to be decorated, more specifically to the temperatures to which they are led to undergo during use.

The application FR-A-2 838 429 describes glass-ceramic plates which are intended notably for covering heating elements and which are provided over at least one side with at least one enamel solid and/or with at least one paint layer. The paint layer is advantageously present on the lower side of the plate, with the exception if need be of the heating zones. The paint used advantageously has a degradation temperature of greater than 350° C., generally between 350 and 550° C. Preferably, this is a paint based on silicone resin(s) and particularly preferably, the paint comprises one or more silicone alkyd resins (one or more silicone resins modified by the incorporation of alkyd resin(s)). This paint can also comprise pigments, e.g. $TiO_2$. The means of heating provided is essentially induction heating.

In such a context, the inventors have conceived novel plates, of glass-ceramic and of glass, with a colored coating fixed to their lower side, which are particularly efficient in terms of:
stability, in use, of the color of said colored coating;
stability, in use, of the cohesion of said coating and of its attachment to the lower side of the plate;
adaptability of said coating to induction heating (with use temperatures of up to 350° C., eventually temperature peaks up to 500° C.) and to the heating with halogen or radiant electric heating elements (with use temperatures of 650 to 700° C.); and
mechanical properties: the mechanical properties of said plates are not affected by the presence of said coating. On the contrary, even an improvement of said properties is observed.

The technical problem tackled was that of the stability of the color of such a coating with temperature. The coating, which is the key of the invention, proposed with reference to this technical problem has, in an entirely surprising way, revealed to be efficient with reference to all the points of the specifications above, this being despite an evolution of its nature from organic to inorganic. This affirmation is understood better upon consideration of the following.

SUMMARY OF THE INVENTION

Thus, according to a first aspect of the present invention, it is provided a plate, having two approximately parallel main sides, of a glass-ceramic or a glass displaying a certain transparency, with a colored coating fixed to at least one part of the surface of one of said two main sides, characterized in that said colored coating essentially consists of a mixture of: (i) inorganic fillers, which ensure its coloration and its mechanical reinforcement, and (ii) at least one cross-linkable polysiloxane resin which is (almost) free from precursor(s) of carbon-containing material(s), in which said fillers (i) are distributed.

A second aspect of the present invention is a heating plate, particularly a cook-top, (intended to be) fitted above heating elements, characterized in that it consists of a plate described supra, (intended to be) fitted with its side bearing said colored coating placed facing said heating elements.

A third aspect of the present invention is a method of preparing a plate described supra, characterized in that it comprises depositing, on at least one part of the surface of a main side of a glass-ceramic plate or glass plate or of a precursor plate of such a plate, at least one layer which essentially comprises a mixture of: (i) inorganic fillers, which ensure its coloration and its mechanical reinforcement, and (ii) at least one cross-linkable polysiloxane resin which is (almost) free from precursor(s) of carbon-containing material(s), in which said fillers (i) are distributed.

DETAILED DESCRIPTION OF THE INVENTION

A first object of the present invention is in fact:
plates, which are precursors of plates which are suitable as a heating plate; as well as
plates, which are obtainable from of said plates, which are suitable as heating plates.

This means:
plates; i.e. of full elements which have two approximately parallel main sides (of a thickness which is less than the surface of said main sides);
of a glass-ceramic or a glass; the glass in question can be of various natures. It can be a precursor glass, for a precursor plate, a glass-ceramic precursor glass, or a toughened glass precursor glass (to be heat-toughened). It can be a toughened glass or a glass for the "final" plate;
having a certain transparency: totally transparent or sufficiently transparent in order that their colored coating (see below) be perceptible through their thickness;
with a colored coating fixed to at least one part of the surface of one of their two main sides: said colored coating is intended to be positioned on the side of the heating elements and to be seen through the thickness of the plate. Said colored coating is based on a colorless resin filled with colorant(s).

Said plates, of a glass-ceramic or of a glass, which is a precursor or not, are characterized by the originality of their colored coating and can exist, with reference to said coating, in various forms:
plates, with said colored coating which is non-heat treated;
plates, with said colored coating, which is heat treated in a more or less severe manner, homogeneously or not, over all the surface of said coating.

According to a variant, the heat treatment in question treats both a precursor glass (glass-ceramic precursor or toughened glass precursor) and its coating.

The invention, under its product aspect, therefore exists as numerous variants.

According to a first variant, the plates of the invention are plates of the above type:
of a glass-ceramic, or
of a glass (a glass, a toughened glass called "final" glass or glass-ceramic precursor glass, toughened glass precursor glass, called "precursor" glass, which is intended to be concerned by the heat treatment), the original colored coating of which essentially consists of a mixture of: (i) inorganic fillers, which ensure its coloration and its mechanical reinforcement, and (ii) at least one cross-linkable polysiloxane resin which is (almost) free from precursor(s) of carbon-containing material(s), in which said fillers (i) are distributed.

This original colored coating is intended to be heat treated, at least in part, under conditions which are more or less severe, in a factory or on the premises of the user of the plate. The heat treatment in question can only concern the coating or the whole precursor glass plate+coating. The person skilled in the art has understood that a mild heat treatment can mainly ensure the cross-linking of the resin on a final glass type plate or a glass-ceramic type plate, whereas a severe heat treatment can mainly ensure the cross-linking and then the pyrolysis of said resin on a final glass type plate or a glass-ceramic type plate, or, at the same time, said cross-linking and pyrolysis of said resin and the heat treatment of a precursor glass type plate.

The nature of the two constituents of said original coating: the cross-linkable resin and the inorganic fillers, are specified further on in the present text, after having set forth all the variants of the plates of the invention.

According to a second variant, the plates of the invention are plates of the above type:
of a glass-ceramic, or
of a glass (a glass or a toughened glass, called "final glass"),
which are obtainable by heat treatment of plates as described above (plates of a glass-ceramic or of a glass called "final glass"); i.e. the colored coating of which consists, at least in part, advantageously in its totality, of a mixture of: (i) inorganic fillers, which ensure its coloration and its mechanical reinforcement, and (ii) at least one cross-linked polysiloxane resin which is (almost) free from carbon-containing material(s), and from precursor(s) of carbon-containing material(s), in which said fillers (i) are distributed.

Here, the polysiloxane resin in question is, at least in part, cross-linked and cross-linked only.

According to an advantageous embodiment, said resin is (only) cross-linked in its totality.

According to another embodiment, said resin is cross-linked (only) in part. In the other part, the resin has not been heat treated, it has remained "virgin". It may for example be conceived that the resin is intended to be removed from the areas wherein it has not been heat treated.

According to another embodiment, said resin is partially cross-linked and partially pyrolyzed, i.e. partially converted into a porous inorganic matrix. Characteristically, the colored coating of the invention is thus both organic (a resin which is only cross-linked) and inorganic (a pyrolyzed resin).

Obviously, this second variant covers yet another embodiment wherein the colored coating exists in three forms: with cross-linked resin, with non-heat treated resin, and with pyrolyzed resin.

According to a third variant, the plates of the invention are plates of the above type:
of a glass-ceramic, or
of a glass (a glass or a toughened glass, called "final glass"),
which are obtainable by heat treatment of plates as described above (plates of a glass-ceramic or a glass called "precursor glass" or "final glass"); i.e. the colored coating of which consists, at least in part, advantageously in its totality, essentially of a mixture of: (i) inorganic fillers, which ensure its color and its mechanical reinforcement, and (ii) a silica-based porous inorganic matrix, which is (almost) free from carbon-containing material(s), in which said fillers (i) are distributed.

Here, the coating in question is, at least in part, an inorganic coating.

According to an advantageous embodiment, the resin has, in its totality, been pyrolyzed and is thus found, in its totality, mineralized.

According to another embodiment, said resin has been only partially heat treated and only partially pyrolyzed. In the other part, the resin has not been heat treated, it has remained "virgin". It can for example be conceived that it is intended to be removed from the areas wherein it has not been heat treated.

According to another embodiment, of the type of that already presented above, the resin was partially pyrolyzed, partially converted into an inorganic matrix and partially cross-linked only. Characteristically, the colored coating of the invention is thus both organic and inorganic.

Obviously, this third variant covers another embodiment, of the ternary type already presented above, wherein the colored coating exists in three forms: with pyrolyzed resin, with non-heat treated resin, and with cross-linked resin.

A category of plates of the invention above has been taken up in a fourth variant, which is artificial, of plates called "mixed" plates. The colored coating of mixed type essentially consists, for one part, of a mixture of: (i) inorganic fillers, which ensure its coloration and its mechanical reinforcement, and (ii) at least one cross-linked polysiloxane resin which is (almost) free from carbon-containing material(s), and from precursor(s) of carbon-containing material(s), in which said fillers (i) are distributed and, for the other part, of a mixture of: (iii) inorganic fillers, which ensure its coloration and its mechanical reinforcement, and (iv) a silica-based porous inorganic matrix, which is (almost) free from carbon-containing material(s), in which said inorganic fillers (iii) are distributed.

The fillers in question (i) and (iii) are of the same type or not; the inorganic matrix (iv) results from the pyrolysis of the cross-linked resin (iii) or from the pyrolysis of another resin. This depends upon the method which is used.

It has been understood that the plates of the invention can be analyzed mainly as follows:
  a) plates (with a precursor base substrate or not) with the filled cross-linkable resin,
  b) plates with the cross-linked filled resin,
  c) plates with the pyrolyzed filled resin, and
  d) plates with the filled resin which is cross-linked in part only and, for the other part, pyrolyzed.

The plates of the invention which contain cross-linkable resin filled with filled cross-linked resin or/and pyrolyzed filled resin, are not described below in detail. The person skilled in the art easily conceives their existence in view of the following description of other types of plates.

The base substrate of the plates of type a) above, on which the filled cross-linkable resin is incorporated, can therefore be:
  a precursor plate: of a glass-ceramic precursor glass ("green glass") or of a toughened glass precursor glass (toughened by heat treatment); or
  a plate: of a glass-ceramic, of a toughened glass or of a glass.

Characteristically, said filled cross-linkable resin comprises:
  as fillers, inorganic fillers which ensure its coloration and its mechanical reinforcement. A same type of fillers, colored fillers, can ensure the desired color and the mechanical reinforcement expected (cohesion of the coating, fixing of it, problem of the appearance and of the propagation of cracks within it . . . ). According to another variant, two types of fillers can be incorporated in addition: fillers for the mechanical reinforcement (which are non-colored) and other fillers (generally coloration pigments) for the coloration. It is furthermore not excluded to incorporate, in combination, such coloration pigments with fillers for mechanical reinforcement which are colored. Such fillers are known to the person skilled in the art. They are incorporated, in effective amounts, in the cross-linkable resin;
  in an original base which is constituted of at least one cross-linkable polysiloxane resin which is (almost) free from precursor(s) of carbon-containing material(s). One or more resins of this type are incorporated in a mixture. It (they) are polysiloxane type resin(s): it (they) can cross-link and can mineralize.
  which is (are) (almost) free from carbon-containing material(s): it is under this condition alone that the color stability of the coating can be guaranteed.

This condition excludes the intervention of silicone alkyd resins as mentioned in application FR-A-2 838 429.

Said filled cross-linkable resin, by virtue of the intrinsic nature of each one of its constituents set forth above, can generate the efficient colored coatings of plates which are adapted to the heating by induction and by halogen or radiant heating elements.

The base substrate of the plates of type b), c) and d) above is in general a plate of a glass-ceramic, of a toughened glass or of a glass.

Said cross-linked filled resin characteristically comprises:
  the fillers of the type specified above: which are more particularly apt to confer the color desired and to slow down, even prevent, the propagation of cracks;
  in the original base of the type specified above, which is cross-linked.

The cross-linked polysiloxane resin is (almost) free from carbon-containing material(s), and from precursor(s) of carbon-containing material(s). The implementation of the cross-linking has not generated such carbon-containing material(s) and, furthermore, any further heat treatment, which is accidental or on purpose, cannot generate such carbon-containing material(s), in view of the absence of carbon-containing precursor(s). The color stability desired is thus ensured with temperature.

The plates of this type (type b) above), with a colored coating, of cross-linked polysiloxane resin(s) which is (are) (almost) free from carbon-containing material(s) and from precursors of carbon-containing material(s), are more particularly efficient within the context of induction heating. The color stability was, in the Examples below, verified of the colored coating and the beneficial influence of said coating upon the mechanical properties of the plate was quantified.

Said pyrolyzed filled resin characteristically comprises:
  the fillers of the type specified above: which are always apt to confer the color desired and to slow down, even prevent, the propagation of cracks;
  in a silica-based porous inorganic matrix, which is (almost) free from carbon-containing material(s).

This inorganic matrix is able to result from the pyrolysis of the cross-linkable polysiloxane resin. This inorganic matrix is (almost) free from carbon-containing material(s), insofar as said resin is (almost) free from precursor(s) of carbon-containing material(s).

The plates of this type (type c) above), with inorganic colored coating, which is (almost) free from carbon-containing material(s) (from any trace of organic material) are more particularly efficient in a context of heating with halogen or radiant heating elements. The color stability of the colored coating was verified in the Examples below.

For the plates of type d), they comprise a colored coating of mixed type, in part of type b), as set forth above, and in part type c), as set forth above.

The following may be specified in a totally non-limiting manner with reference to the constituents of the colored coatings of the plates of the invention, notably of type a), b), c) or d) above.

Advantageously, a part of the inorganic fillers has a lamellar structure. Cohesion of the coating is gained therewith, with resistance to cracking of it.

Advantageously, in the at least one polysiloxane resin, which is cross-linked or not, said fillers are incorporated at a volume content of between 10 and 60%, based on the total volume of said fillers and of said at least one resin. Below this, it is in general difficult for said fillers to ensure their function as mechanical reinforcement. Above this, said fillers do not in general leave enough volume to said resin. There is no longer any cohesion of the whole and therefore no more mechanical reinforcement. Very advantageously, said fillers are incorporated at a volume content of between 15 and 30%, based on the total volume of said fillers and said at least one resin.

With reference to the at least one polysiloxane resin, it has been indicated that when it is non-cross-linked, it is (almost) free from precursor(s) of carbon-containing material(s) and that when it is cross-linked, it is (almost) free from carbon-containing material(s), and from precursor(s) of carbon-containing material(s); this is indeed logical in the hypothesis that said cross-linked resin is obtained by cross-linking of said non-cross-linked resin. In any case, said at least one polysiloxane resin, which is cross-linked or not, advantageously has a purity of at least 90% by weight, very advantageously a purity of at least 95% by weight. A resin of maximum purity is used for a maximum color stability.

Said polysiloxane resin advantageously has phenyl, methyl, ethyl, propyl and vinyl moieties in its formula, very advantageously phenyl and/or methyl moieties. Preferably, the resin is selected from:
  polydimethylsiloxanes,
  polydiphenylsiloxanes,
  phenylmethylsiloxane polymers, and
  dimethylsiloxane-diphenylsiloxane copolymers.

Whatever its exact nature be, the resin is cross-linkable, in general by virtue of the presence of SiOH and/or SiOMe groups in its formula. Such groups are generally incorporated up to 1 to 6% by weight of its total weight.

Said polysiloxane resin generally has a weight average molecular weight (Mw) of between 2,000 and 300,000 Daltons.

In a totally non-limiting manner, it can be indicated that Dow Corning® 804, 805, 806, 808, 840, 249, 409 HS and 418 HS resins, Rhodorsil® 6405 and 6406 resins from Rhodia, Triplus® resin from General Electric Silicone and SILRES® 604 resin from Wacker Chemie GmbH are perfectly suitable.

The thickness of the colored coating of the plates of the invention (notably based on at least one cross-linkable polysiloxane resin, or based on at least one cross-linked polysiloxane resin, or based on at least one pyrolyzed polysiloxane resin, or based on at least one cross-linked and pyrolyzed mixed resin) is generally of between 1 and 100 μm, advantageously between 5 and 50 μm.

The second object of the present invention is now come to: heating plates, particularly cook-tops, which notably consist of plates of type b), c) or d) above. Said plates are or are intended to be fitted on top of heating elements, their side bearing the colored coating placed facing said heating elements.

The plates of type b) above are particularly efficient in a context of induction heating. Their coating is stable, more particularly in color. Their mechanical properties are reinforced by said coating. Furthermore, the plates can take, without any harmful effects, peaks in temperature.

The plates of type c) above are particularly efficient in a context of heating with halogen or radiant electric elements. Their coating is stable, more particularly in color.

The plates of type d) above are particularly efficient in a context of mixed heating. The coating is adequate, stable, notably in color, and vis-à-vis various heating elements.

All the plates of the types b), c) and d) above are furthermore obtainable from the same plates of type a) (with precursor coating).

Within the context of this second object of the present invention, privilege is given to the heating plates above for use as cook-tops in an induction heating cooking article.

Finally, the third object of the present invention is specified: the method of preparing said plates.

Whatever the type of plate concerned (glass-ceramic plates, toughened glass plates or glass plates, precursor plates of a glass-ceramic precursor glass or toughened glass precursor glass), said method comprises depositing, on at least one part of the surface of a main side of said plate, of at least one layer essentially comprising a mixture of: (i) fillers, which ensure its coloration and its mechanical reinforcement, and (ii) at least one cross-linkable polysiloxane resin which is (almost) free from precursor(s) of carbon-containing material (s), in which said fillers (i) are distributed.

Said layer essentially comprises said mixture ((i)+(ii)), but it is not excluded that it contains at least one other constituent, e.g. a diluent.

This depositing phase can be implemented by any technique which is adapted to the nature of the layer to be deposited (filled polysiloxane resin). Said layer can notably be deposited by deposition with a brush, by deposition with a blade, by pulverization (spraying), by electrostatic deposition, by immersion, by curtain deposition, by screen printing. This list is not exhaustive. Advantageously, the filled polysiloxane resin is deposited by screen printing.

As indicated above, with reference to the plates, it is recalled here that advantageously:
  at least one part of the inorganic fillers has a lamellar structure; and/or
  said at least one cross-linkable polysiloxane resin has a purity of at least 90% by weight, very advantageously of at least 95% by weight.

The other precisions given above with reference to each one of the constituents of the layer deposited (of the above coating) can also be recalled here.

The plate (of glass-ceramic, toughened glass or glass) or precursor plate (of glass-ceramic precursor glass or of toughened glass precursor glass, to be heat toughened), coated with said at least one layer, as deposited, constitutes a precursor plate of plates, which are suitable as cook-tops in the sense of the invention. The plate can thus be manipulated in a factory or even on the user's premises. This is a plate of type a) above. It is brought in to be heat treated; the heat treatment in question concerns only said at least one layer or, jointly, said at least one layer and a precursor plate.

In this latter hypothesis, the method of the invention comprises:
  depositing said at least one layer; and
  heat treating, which is implemented under conditions which ensure, jointly, the conversion of said precursor plate (of a glass-ceramic precursor glass or of a toughened glass precursor glass) into a plate (of glass-ceramic or of toughened glass) and the cross-linking of said deposited layer(s), its (their) fixing and its (their) pyrolysis.

The heat treatment in question is a severe heat treatment (of ceramisation or of heat toughening, known to the person skilled in the art), which forcibly leads to the pyrolysis of the layer deposited. The polysiloxane resin deposited is thus 100% mineralized.

This same type of heat treatment, which is severe, can be implemented in order to concern only said at least one layer deposited on a glass-ceramic or glass plate (toughened glass or glass).

It has been understood that plates of the invention called type c), above, are thus obtained.

The pyrolysis is generally implemented at a temperature of greater than 400° C., in an oven or under the action of infrared rays.

In another hypothesis, a mild heat treatment is implemented which concerns only said at least one layer deposited. In this hypothesis, the method of the invention comprises:
  depositing said at least one layer on a glass-ceramic plate or glass plate (glass or toughened glass); and
  heat treating, which is implemented under conditions which ensure the cross-linking of said deposited layer(s) and its (their) fixing, cross-linked, to said plate.

This mild heat treatment can be implemented by any means, notably with a hot gas current, by radiation, for example of infra-red type, or electric methods of microwave, inductive heating, high frequency heating and radiant heating type. It leads to plates of type b) above.

Finally, it has been seen that plates of the invention can have a mixed-type coating (plates of type d) above). In view of the foregoing, it has been understood that they can notably be obtained as follows:
  by depositing said at least one layer on a glass-ceramic plate or glass plate (glass or toughened glass); and then
  heat treating said at least one layer, said heat treatment being first of all carried out under (mild) conditions which ensure the cross-linking of said deposited layer(s) and the fixing of this (these), which is (are) cross-linked, to said plate and then, on only a part of said attached cross-linked layer(s), under (severe) conditions which ensure the pyrolysis of said cross-linked layer(s), which is (are) attached.

The above heat-treatment comprises two steps. These steps can be carried out according to various variants. The first can be carried out in a factory. Then, the plate can be commercialized with its cross-linked filled polysiloxane coating. It is then on the premises of the user, during the first uses, that said coating is pyrolyzed, opposite the halogen or radiant heating elements and that a plate with mixed type coating is generated. It is easily conceived that such a mixed type coating can be generated directly in a factory. Plates can notably be made with only 50% of the surface of the coating cross-linked, the other 50% pyrolyzed.

It is not excluded from the context of the invention that such mixed type plates be obtained from different coatings (due to their filler and/or their base resin: different relative nature or (and) proportion). The deposition of said coatings on the various zones of the plate is conceived and then their different heat treatment.

The person skilled in the art has furthermore understood that plates of the invention which comprise cross-linkable resin filled with filled cross-linked resin or/and pyrolyzed filled resin can be obtained analogously. After depositing the resin in question, it is not heat treated over all the surface of the plate. The plate remains "virgin" in at least one zone. It has been seen that this can reveal to be interesting in the hypothesis notably wherein it is then foreseen to get rid of said non-cross-linked resin, to strip said at least one zone.

For all intents and purposes, it is also specified at this juncture that plates with coatings of the types described, of non-uniform composition (e.g. as to the nature of the fillers and/or resins used, as to the content of the fillers incorporated), also make up an integral part of the context of the invention.

Whatever the means of preparing the plates be, it is insisted at this juncture upon the unexpected performances of their original coating.

The invention is now illustrated under the aspects of product and method, in a totally non-limiting way, by the Examples below.

EXAMPLES

Example 1

A white coating composition (referenced A in the Table below) is prepared in the following way:

10 g of Dow Corning® 249 silicone polymer granules are dissolved in 10 g of Dow Corning® 840 silicone resin (60% polymer solution in toluene). This dissolution is made under agitation at 80° C.

After cooling, 7.46 g of interferential pigment, of lamellar structure, Iriodin® 123 (Merck) and 3.73 g of TiO$_2$ RL628 (Ferro Couleurs France S.A.) are added to the solution and are mixed until homogenization.

This composition is applied by layering with a blade ("doctoring") on glass blades (Corning 1737–75×25×1.1 mm) and is polymerized for 1 hour at 250° C. for a dry film thickness of about 25 microns.

Example 1' (Comparative Example)

A commercial white coating alkyd-modified silicone composition (referenced C in the Table below) is also applied by doctoring on glass blades (Corning 1737–75×25×1.1 mm) and is polymerized for 1 hour at 250° C. for a dry film thickness of about 25 microns.

After heat ageing tests in a static oven under the conditions given in Table 1 below, the color points x, y are derived from the measurements made by reflection onto the side equipped with the coating of the samples, and this with the aid of a CS3 spectrophotometer from Applied Chroma Systems (D65 illuminant/observer at 10°):

TABLE 1

| Heat ageing | x − A | Y − A | x − C | y − C |
|---|---|---|---|---|
| reference (non-aged) | 0.3161 | 0.3344 | 0.3182 | 0.3370 |
| 100° C./2 hours | 0.3169 | 0.3352 | 0.3186 | 0.3374 |
| 200° C./2 hours | 0.3159 | 0.3343 | 0.3204 | 0.3391 |
| 300° C./2 hours | 0.3163 | 0.3346 | 0.3254 | 0.3415 |
| 400° C./2 hours | 0.3168 | 0.3349 | 0.3228 | 0.3389 |

The measurements confirm the evolution of color towards yellow, gray-yellow, which is visible to the eye, of the samples equipped with the coating referenced C with the ageing temperature ($x_{max}-x_{min}$: 0.0084 and $y_{max}-y_{min}$: 0.0045 over all the samples C).

The samples equipped with coating A which correspond to the invention have hardly any evolution of color for the various ageing conditions (x max.−x min.: 0.0010 and y max.−y min.: 0.0009 over all the samples A).

All these samples (non-aged or aged) show a good glass-coating adhesion and a good cohesion of the coating itself, in line with the application sought after.

Example 2

A white coating composition is prepared in the following way:

40 g of Dow Corning® 249 silicone polymer granules are dissolved in 18 g of Exxon Solvesso® 100 solvent from Exxon Mobil Chemical. This dissolution is carried out under agitation at 80° C.

After cooling, 29.1 g of 325 mesh muscovite mica (CMMP: Comptoir des Minéraux et Matières Premières) and 14.6 g of RL628 TiO$_2$ (Ferro Couleurs France S.A.) are added to the solution and are mixed until homogenization. This composition is applied by screen printing (screen: 90 strands/cm) on transparent glass-ceramic substrates (Eurokera) and is polymerized for 1 hour at 250° C. for a dry film thickness of about 15 microns.

After heat ageing tests in a static oven under the conditions given in Table 2 below, the color points x, y are derived from the measurements made by reflection onto the glass-ceramic side of the samples equipped with their white coating, and this with the aid of a CS3 spectrophotometer from Applied Chroma Systems (D65 illuminant/observer at 10°):

TABLE 2

| Heat ageing | x | y |
|---|---|---|
| reference (non-aged) | 0.3371 | 0.354 |
| 330° C./475 hours | 0.3375 | 0.3548 |
| 400° C./15 hours | 0.3382 | 0.3555 |
| 510° C./9 hours | 0.3453 | 0.3616 |
| 700° C./20 hours | 0.3382 | 0.354 |

A very low evolution of color of the samples is observed under these heat ageing conditions.

All these samples (non-aged or aged) show a good glass-ceramic-coating adhesion and a good cohesion of the coating itself, in line with the application sought after.

The mechanical resistance of non-aged samples, and samples aged for 15 hours at 400° C. and 9 hours at 510° C. is compared to the mechanical resistance of the glass-ceramic substrate without coating, by the classical measurement of the modulus of rupture (MOR).

This test is made on disc-shaped samples of 32 mm diameter and the thickness of which is brought to 2.1 mm by polishing. The filler is applied onto the upper side of the disc, the colored coating being situated on the lower side, the disc lying on a three-legged support. The contact is ensured by a ball of 1.79 mm diameter. The speed of descent of the point of contact is 0.3 mm/minute. The calculation of the MOR is made with the hypothesis of a Poisson coefficient of 0.2.

The following results show the notable improvement of the MOR in the cases of the samples which are equipped with the white coating according to the invention, including after heat ageing at 400 and 510° C., with respect to the non-coated glass-ceramic substrate.

| | MOR (MPa) |
|---|---|
| Non-coated substrate (14 samples): | 208 ± 71 |
| Substrate with white coating (8 samples): | 243 ± 68 |
| Substrate with white coating aged at 400° C./15 h (5 samples): | 271 ± 54 |
| Substrate with white coating aged at 510° C./9 h (6 samples): | 259 ± 66 |

Example 3

A metallized red coating composition is prepared in the following manner:

48 g of Dow Corning® 249 silicone polymer granules are dissolved in 23.5 g of Exxon Solvesso® 100 solvent from Exxon Mobil Chemical. This dissolution is made under agitation at 80° C.

After cooling, 36.9 g of Iriodin® 524 (Merck) interferential pigment are added to the solution and are mixed until homogenization.

This composition is applied by screen printing (screen: 43 strands/cm) on transparent glass-ceramic substrates (Eurokera) and is polymerized for 1 hour at 250° C. for a dry film thickness of about 35 microns.

After heat ageing tests in a static oven under the conditions given in Table 3 below, the color points x, y are derived from the measurements made by reflection onto the glass-ceramic side of the samples equipped with their red coating, and this with the aid of a CS3 spectrophotometer from Applied Chroma Systems (D65 illuminant/observer at 10°):

TABLE 3

| Heat ageing | x | y |
|---|---|---|
| reference (non-aged) | 0.4194 | 0.3303 |
| 330° C./475 hours | 0.4191 | 0.332 |
| 400° C./15 hours | 0.4173 | 0.332 |
| 510° C./9 hours | 0.4171 | 0.3354 |
| 700° C./20 hours | 0.4203 | 0.3365 |

A very low evolution of color of the samples is observed under the conditions of heat ageing.

All these samples (non-aged or aged) show a good glass-ceramic-coating adhesion and a good cohesion of the coating itself, in line with the application sought after.

Example 4

In order to obtain yellow-gold (A), black (B), gray (C) coatings, compositions are prepared in the following way:

A: 48 g of Dow Corning® 249 silicone polymer granules are dissolved in 23.4 g of Exxon Solvesso® 100 solvent from Exxon Mobil Chemical. This dissolution is made under agitation at 80° C.

After cooling, 36.7 g of Iriodin® 502 interferential pigment (Merck) are added to the solution and are mixed until homogenization.

B: 48 g of Dow Corning® 249 silicone polymer granules are dissolved in 20.9 g of Exxon Solvesso® 100 solvent from Exxon Mobil Chemical. This dissolution is made under agitation at 80° C.

After cooling, 9.7 g of graphite (2 microns) (Aldrich), 9.7 g of talc (particle size 10 microns) (Aldrich) and 26 g of FA1204 black pigment (Pemco Brugge N.V.) are added to the solution and are mixed until homogenization.

C: 48 g of Dow Corning® 249 silicone polymer granules are dissolved in 22.2 g of Exxon Solvesso® 100 solvent from Exxon Mobil Chemical. This dissolution is made under agitation at 80° C.

After cooling, 36.8 g of Iriodin® 123 interferential pigment (Merck) and 2.3 g of V7709 black pigment (Ferro Couleurs France S.A.) are added to the solution and are mixed until homogenization.

These compositions are applied by screen printing (screen: 90 strands/cm) on transparent glass-ceramic substrates (Eurokera). The polymerisation is done for 1 hour at 250° C. for a dry film thickness of about 15 microns.

Plates of the invention are then obtained which are perfectly suitable for induction heating.

Example 5

A red coating composition is prepared analogously to Example 3.

This composition is applied by screen printing (screen: 120 strands/cm) on transparent glass-ceramic precursor glass substrates (Eurokera). The polymerisation of the coating and the ceramisation of the glass are carried out simultaneously using the following heating cycle:

rise to 685° C. in 10 minutes,
plateau of 20 minutes at 685° C.,
rise in 25 minutes to 930° C.,
plateau of 20 minutes at 930° C., and
rapid cooling.

The glass-ceramic samples obtained have a red inorganic coating of about 10 microns thickness. These samples have a good glass-ceramic-coating adhesion, a good cohesion of the coating itself, and show an interesting color stability, in line with the application sought after.

The invention claimed is:

1. A plate of a glass or a glass ceramic comprising a colored coating fixed to at least one part of a surface of the plate, to be fitted above heating elements with its side bearing said colored coating placed facing said heating elements, wherein said colored coating consists essentially of a mixture of:
   (i) inorganic fillers, which ensure its coloration and its mechanical reinforcement, and
   (ii) at least one cross-linkable polysiloxane resin which is essentially free from precursor(s) of carbon-containing material(s), other than the polysiloxane resin, in which said fillers (i) are distributed, wherein the resin is partially cross-linked and partially pyrolyzed.

2. A plate according to claim 1, characterized in that said plate further comprises a second colored coating of a mixture of:
   (iii) inorganic fillers, which ensure its coloration and its mechanical reinforcement, and
   (iv) a silica-based porous inorganic matrix which is essentially free from carbon-containing material(s), in which said fillers (iii) are distributed.

3. The plate according to claim 1, characterized in that at least one part of said fillers has a lamellar structure.

4. The plate according to claim 1, characterized in that said fillers are incorporated in at least one polysiloxane resin, which is cross-linked or not, at a volume content of between 10-60%.

5. The plate according to claim 1, characterized in that said polysiloxane resin is selected from:
   polydimethylsiloxanes,
   polydiphenylsiloxanes,
   phenylmethylsiloxane polymers, and
   dimethylsiloxane-diphenylsiloxane copolymers.

6. The plate according to claim 1, characterized in that said colored coating has a thickness of between 1 and 100 μm.

* * * * *